United States Patent [19]

Blood et al.

[11] 4,220,992
[45] Sep. 2, 1980

[54] PORTABLE EVENT ANALYSIS DEVICE

[76] Inventors: Thomas S. Blood, 3711 S. 16th St., Arlington, Va. 22204; Stephan F. Hooker, 1310 N. Abingdon St., Arlington, Va. 22207

[21] Appl. No.: 957,152

[22] Filed: Nov. 3, 1978

[51] Int. Cl.³ .................... G06F 3/06; G06F 15/44
[52] U.S. Cl. .................... 364/410; 35/29 A; 235/92 GA; 273/183 R; 364/709
[58] Field of Search ............ 364/403, 410, 900, 709, 364/728; 340/146.2; 273/176 A, 186 A, 179 A, 183 R; 235/92 GA, 92 SH, 92 CA; 35/29 A, 35 R

[56] References Cited

U.S. PATENT DOCUMENTS

| | | | |
|---|---|---|---|
| 3,665,494 | 5/1972 | Baumoel | 364/410 |
| 3,829,664 | 8/1974 | Kashio | 235/92 SH |
| 3,940,742 | 2/1976 | Hudspeth et al. | 364/900 |
| 4,051,605 | 10/1977 | Toal et al. | 364/410 |
| 4,143,417 | 3/1979 | Wald et al. | 364/900 |

*Primary Examiner*—Errol A. Krass
*Attorney, Agent, or Firm*—Roylance, Abrams, Berdo & Farley

[57] ABSTRACT

A portable battery-powered golf analyzing device includes a keyboard usable in an input mode to insert data describing each golf shot made by a player. The data is formed into a digital word and stored in memory. The memory is of a type which is not erased unless a specific signal is intentionally applied thereto. In an output mode, the keyboard is used to form a digital word describing desired data. The memory is then searched and each stored word is compared with the inserted word. Correspondence between the inserted and stored words is counted and the results displayed. A receptacle for the portable unit includes a power supply for recharging batteries in the portable unit and circuits for applying an erasing potential to the memory. Indicators instruct the operator through the sequence of steps in entering a description.

9 Claims, 6 Drawing Figures

PORTABLE EVENT ANALYSIS DEVICE

This invention relates to an apparatus for accumulating information representation of events which have occurred in connection with a particular activity, particularly a sport or game, and for selectively displaying an analysis of those events.

BACKGROUND OF THE INVENTION

In the conduct of both amateur and professional sports, particularly in those sports which receive wide media coverage, it is common for sports commentators, analysts, writers, coaches and others to keep records of the performances by individual competitors to a fine level of detail and to analyze various aspects of those performances. Thus, information is available to the competitors themselves and to the public about scoring records and almost every other aspect of the competitor's actions. His or her strong points and weaknesses can be derived from these records and analyses, and it is certainly the case that study of such weaknesses assists the competitors' efforts to improve.

The individual who is not "well-known" in a particular sport or game and who, therefore, is not the subject of such detailed scrutiny and record keeping, but who is nevertheless intent upon identifying weaknesses, analyzing the causes of those weak areas and improving the chosen activity, is faced with the problem of remembering or otherwise keeping track of each performance for such analysis. Those who are meticulous might find it reasonable to do so with pencil and paper, but for the most part that approach is simply too time consuming and distracting and requires initially establishing a systematic record keeping system which permits collecting the appropriate data during the event so that some meaningful analysis can be accomplished subsequently. Furthermore, many individuals who might be sufficiently motivated to keep the records are not capable of making a meaningful analysis from them.

Although this problem is common to many activities, a particularly notable example is the game of golf which is, or can be, certainly highly competitive but which is an activity in which the individual is competing primarily with himself. Thus, on a given course, while a player's score from one round to the next is dependent to some degree on weather conditions, a companion's skill and the like, the primary factor affecting the final stroke count will be the manner in which the player strikes the ball each time.

It is therefore important for the player to know, for example, that a majority of his "bad" shots are approach shots which tend to be short and to the left; or that his least successful shots are tee shots which slice. While it might be painfully evident to him that the shots made in a particular 18 hole round include too many sliced shots, it may not become apparent that a less obvious, but nevertheless consistent, weakness exists over a history of, for example, ten rounds of 18 holes each. Thus, if the player found that 10% of his tee shots went to the right and and only 2% had other defects (e.g., were "topped" or simply short), he or she would know that correction of a tendency to slice would improve the game, even though only one or two such slices occurred in certain rounds and perhaps no slices occured in some.

Similar remarks could be made about other activities, such as bowling, in which one's performance is gauged primarily by his or her individual efforts in a relatively unchanging environment as distinguished from team sports, such as basketball or football, or those sports or games in which the player is competing directly against, and interacting with, another player, such as in tennis.

As to such team sports, it is often desirable for someone, such as a recruiter or scout, to track one or more participants' performances while observing a game, a task which can be difficult with pencil and paper without missing some of the action.

There is, at the present time, no known device which permits a person to keep track of the details of his performance, or that of another, including characteristics of the quality of that performance, in a convenient and reliable fashion. While various score keeping devices and articles for analyzing and tabulating scores are known, none satisfy the need for performance evaluation as outlined above. Examples of such prior art are shown in the following U.S. patents:

U.S. Pat. No. 3,104,879—Jetton
U.S. Pat. No. 3,665,494—Baumoel
U.S. Pat. No. 3,829,664—Kashio
U.S. Pat. No. 3,945,646—Hammond
U.S. Pat. No. 4,055,349—Hunt et al

BRIEF DESCRIPTION OF THE INVENTION

An object of the present invention is to provide an apparatus for facilitating keeping a record of a series of events over a period of time, including information about the nature and quality of those events, and for selectively displaying cumulative data from one or more such events.

A further object is to provide a portable hand-held device into which data descriptive of certain events and their nature can be entered from time-to-time, which is capable of retaining the data in memory, and from which the data can be recalled and displayed.

Yet another object is to provide a device of the type described which permits recall of the data by category, and display of the cumulative number or percentage of events having predetermined descriptive properties.

A still further object is to provide an electronic battery-powered device having a memory into which records of events and information describing each event, in predetermined descriptive categories, can be entered, and from which the stored records can be recalled and displayed, in groups according to the predetermined descriptive categories entered.

Briefly described, the invention includes an apparatus for storing and retaining data describing a plurality of events and for selectively displaying cumulative descriptive information about those events comprising the combination of a keyboard having a plurality of keys, first logic means coupled to the keyboard for forming a digital word having a predetermined bit length in response to operation of at least one key, an addressable memory, a clock for producing a sequence of timing pulses, a mode switch having an input position and an output position, input logic means coupled to the memory for permitting successive parallel storage of each word formed by said first logic means when said mode switch is in said input position, output logic means connected to the clock, the memory and the mode switch for responding to pulses from the clock only when the mode switch is in the output position to sequentially read out each word from the memory, comparator means coupled to the first logic means and to the memory for comparing each word read out of the memory with a word formed in the first logic means and for producing an output signal when correspondence between the compared words exist, and means for accumulating a count of the output signals and for displaying symbols representative of the count.

In order that the manner in which the foregoing and other objects are attained in accordance with the invention can be understood in detail, particularly advantageous embodiments thereof will be described with reference to the accompanying drawings, which form a part of this specification, and wherein:

In the following description, a specific and particularly desirable form of the invention will be described in detail, this being a golf analyzing apparatus. However, it will be recognized that various other uses of an apparatus constructed as described herein can be used for other purposes. In the golf analysis device which will be described in detail, the overall purpose is to permit a golfer to enter data about the types of shots he is making and to also enter data about whether the shots are long or short, in what direction they travel, and the like, and then to subsequently recall this information and to have it displayed in a form which indicates how many (or what percentage) of each type of shot meet certain requirements.

However, by changing the keyboard and substantially nothing else, it is possible to use the apparatus in many other ways. For example, a photographer could use the device to keep a record of the f-stop, shutter speed, film type or other data on a series of photographs, or a bowler could keep track of the direction and accuracy of each ball rolled for subsequent recall and analysis. The device could also be used by one observing players in a team sport. For example, if a scout for a professional football team wished to observe and analyze the performance of a college football player, or several such players in a single team, it would be possible for him to enter the player number and other characteristics descriptive of his performance while observing the game and to then subsequently analyze the recorded data after the game is over. Again, only the legends on the keys need be changed, although certain games might require modification of the arithmetic logic for particular purposes.

Figure 1:
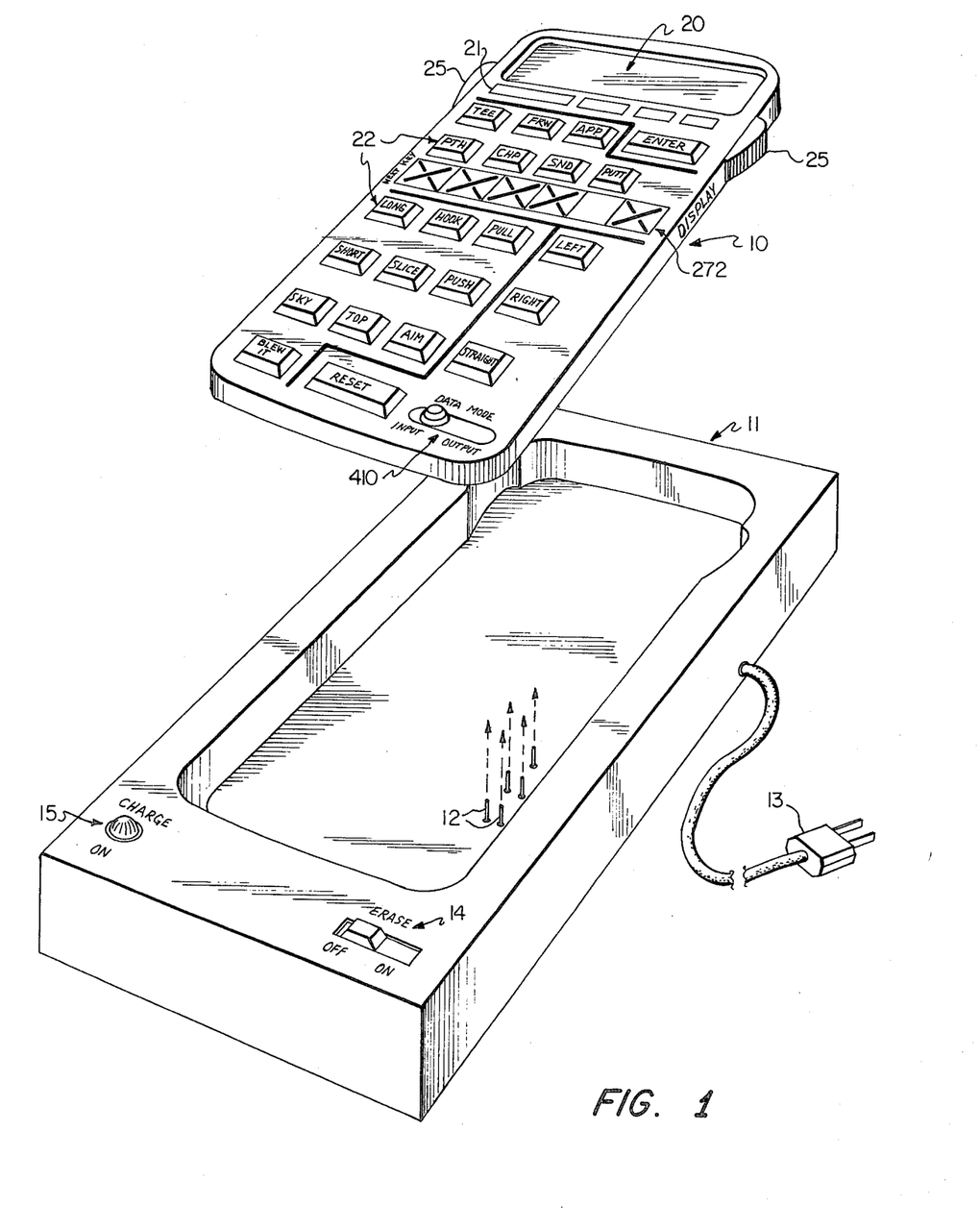
FIG. 1 is a perspective view of a device constructed in accordance with the present invention, illustrating the arrangement of keyboard and display portions thereof, and of a storage caddy for use therewith.

Turning now to the drawings which illustrate a golf analysis device, it will be seen that FIG. 1 shows a perspective view of a hand-held, battery-powered portable unit indicated generally at 10, and a receptacle unit indicated generally at 11. The receptacle unit is designed to receive unit 10 and to electrically engage unit 10, unit 11 having a plurality of pins 12 arranged to enter suitable female receptacles on the back of the hand-held unit. Unit 11, which will be referred to herein as a "caddy", can be connected to a conventional source of line voltage by placing a plug 13 in a conventional wall outlet. The caddy is intended to remain "at home"(i.e., not be carried along in normal usage) and to contain suitable conventional circuitry for rectifying the AC voltage received from plug 13 and supplying it on appropriate ones of pins 12 to hand-held unit. Unit 10 is intended to contain rechargeable batteries which can be recharged over an interval of time (e.g., overnight) whenever the hand-held unit is placed in the caddy. Unit 11 also has an "erase"switch indicated generally at 14 which has a "off" position and an "on" position. As will be described, the memory portion of unit 10 is a "permanent" memory in the sense that it is not erasable by operation of any keyboard switch. Erasing is accomplished only by inserting unit 10 into caddy 11 and placing the erase switch in the "on" position for an interval of time determined by the characteristics of the particular memory selected for use in the unit 10.

Unit 11 also has a "charge" light 15 to simply indicate when charging is being accomplished.

Turning more specifically to unit 10, it will be seen that the unit includes a display window area 20 behind which is a plurality of seven segment alphanumeric display cells, preferably of a liquid crystal variety, and a sequence of regions 21 below the display area to receive indicia indicating the nature of the information being presented in the display area. The unit has a plurality of keys indicated generally at 22 of the push button type which can be depressed to actuate switches to enter various pieces of information. A sequence of illuminatable indicator lights 272 extend across the keyboard, the presence of the indicator lights being indicated in FIG. 1 with X's, the X's having no particular significance except that they can also constitute liquid crystal display presentations rather than incandescent or other lamps which would tend to require relatively high power. The unit also includes a "data mode" switch indicated generally at 410 having an "input" and an "output" position. This can be any type of switch, but is conveniently a slide switch as indicated in the figure.

It will be observed that the keyboard includes 22 push button keys including an "enter" key; a "reset" key; and three groups of keys which are functionally separated by heavy lines which would be preferably inscribed or painted on the keyboard surface. The group of keys nearest the display area defines the various types of shots one would use in a game of golf, the symbols for these being abbreviated on the keys themselves. Thus, these keys are used to enter a type of shot made which would be any one of the following: tee; fairway (frw); approach (app); pitch (pth); chip (chp); sand (snd); and putt (putt).

Along the right-hand side of the keyboard are three keys indicating direction, i.e., left, right and straight. On the left-hand lower side of the keyboard are ten keys which can be used to enter expressions indicating the quality or nature of the shot made other than its direction. Thus, the shot can be described as "long", as a "hook", as a "slice", or the like. The designations shown are, of course, merely examples and any selection of shot qualifiers could be used. However, it is believed that those shown represent the keys needed to reasonably adequately describe any shot likely to be made in a practice session on a driving range or in a round of golf.

On each side edge of unit 10, there is also a button 25 for actuating a slide switch to energize the display of display area 20. The switches associated with buttons 25 are connected in parallel circuit relationship and perform exactly the same functions. The buttons are intended to be thumb operated and are provided on both sides simply to accommodate both right-handed and left-handed individuals. The provision of these buttons is simply to avoid the use of battery power to energize the display when such display is not being actually used.

Figure 2:
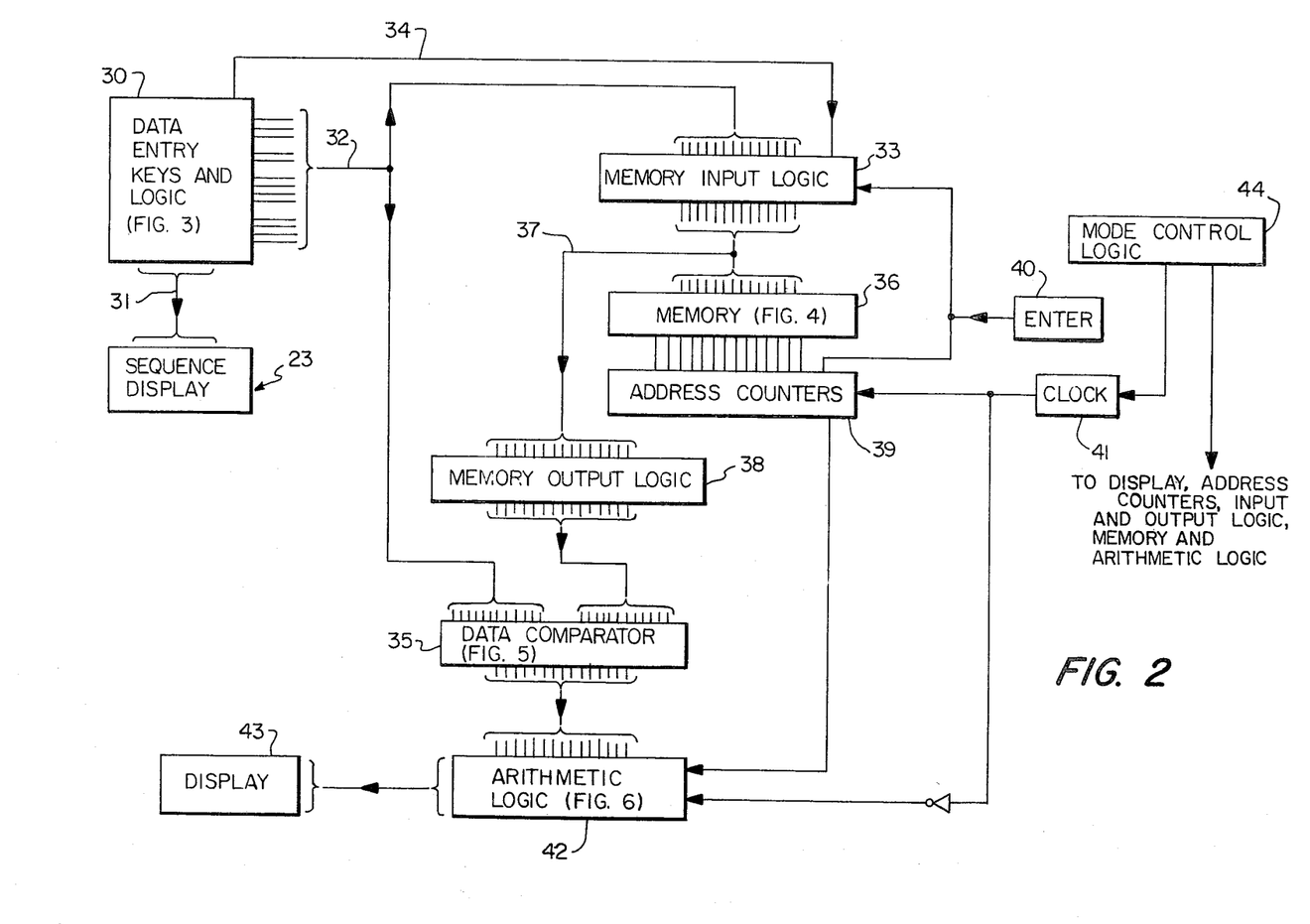
FIG. 2 is a schematic block diagram indicating the arrangement of major portions of an apparatus in accordance with the invention and interconnections and signal flow therebetween

Turning now to FIG. 2, it will be seen that this figure illustrates the basic units of the system to be incorporated in unit 10. The system includes a data entry and logic unit 30 which includes the keys described with reference to FIG. 1, the switches associated with those keys, and logic for forming a 13-bit word upon depression of the suitable key on the keyboard. There are two outputs from unit 30, one being a multi-conductor output 31 to the sequence display which includes illuminatable indicators 272. The other output is the digital word itself which appears on multi-conductor output 32 and is connected to memory input logic unit 33 and to a set of inputs to a data comparator unit 35. Additional logic signals, for control purposes, are indicated as existing on a separate conductor 34 which can also be a multi-conductor cable.

The memory input logic unit is coupled to the input of a memory unit 36 which can receive data bits for storage and which can, with suitable control, provide logic output of words previously stored therein on a multi-conductor cable 37 to a memory output logic unit 35 38, the output of which is also coupled to data comparator 35.

It is important to recognize at this stage that the memory to be used in this device is of a type which is always supplied with power and which continually retains the data stored therein until some special step is taken to erase those data. These memories are available in various forms, including some which are erased by exposure for some interval of time to ultraviolet light. However, the preferred form is an EAROM memory (Electrically Alterable Read Only Memory) which is, essentially, "programmed" by the entry of data from the keyboard. Once entered, the data cannot be changed or erased until a specific terminal or set of terminals on the memory itself is subjected to a voltage specified by the manufacturer for a specific time interval. The data can, however, be read out, repeatedly and nondestructively, in a conventional fashion. Various models of memories of this general type, having differing capacities, are available from General Instrument Corporation Microelectronics, Hicksville, N.Y. 11802. Ten model ER1400 units, connected to form a single memory are suitable for the present device, although larger capacity memories could, of course, be chosen. Suitable logic, such as parallel-to-serial logic, if needed to establish addressing, is provided, depending on the memory chosen.

To control the operation of the memory unit 36, address counters 39 are coupled to the memory unit, the address counters being controlled, in the "input" mode, by an output from an enter switch 40 (connected to the enter button on the keyboard) and, in the "output" mode, by pulses received from a clock 41. Control pulses from clock 41, a control pulse from address counters 39, and the results of a data comparison from unit 35 are all supplied to an arithmetic logic unit 42 which performs counting and simple arithmetic functions, the details of which will be described hereinafter. The results of the arithmetic operations are delivered to a display unit 43 for display, as desired.

The clock 41 and certain other elements of the system are also under the control of a mode control logic unit 44.

The overall operation of the system will first be described with reference to FIG. 2, and then, subsequently, the details of the logic within these blocks will be described to the extent necessary. As previously indicated, the system is usable in two modes, the "input" mode and the "output" mode. The operation will be described in the same sequence as it might normally be used, and it will therefore be assumed that a player is beginning a round of golf and that he therefore removes the hand-held unit 10 from caddy 11 with the battery fully charged, the memory erased, and the mode selector switch button 410 in the "input" position.

After arrival at the golf course, and upon completion of the first tee shot, the player presses the button marked "tee" followed by, for example, the button "left" and the buttons "hook" and "short". This sequence will be assumed to properly describe the shot which was made. The logic associated with the keyboard forms a 13-bit digital word representative of the information which has been entered and supplies this 13-bit word to the memory input logic unit 33. While the 13-bit word is also delivered to the data comparator, the comparator is inoperative in the "input" mode, and therefore does nothing. Having completed the formation of this word, the enter button is depressed, causing the memory input logic to insert the word into memory unit 36 in the first available address, and causing the address counters to cycle to the next available address. As will be recognized, a single address constitutes 13-bit spaces in the memory, and the next address constitutes the next array of 13-bit spaces, in sequence.

The player then proceeds to his fairway, approach, and other shots, and upon completion of each shot enters the appropriate information on the keyboard as described. Each word is sequentially stored in the memory.

It will be observed, at this stage, that no use has been made of the memory output logic, the data comparator, the arithmetic logic, the display, or the clock. Further, it will be observed that unit 10 is, essentially, always "on", and that there is no action involved in turning the unit on or off except for purposes of activating or deactivating the display function as to the indicators 23.

After the completion of the round of golf, or at some subsequent time, let us assume that the golfer wishes to determine the nature of his game. For this purpose, he moves the mode switch to the "output" position, thus activating the memory output logic, the comparator, the arithmetic logic and clock 41, and deactivating the memory input logic. Assume further, that the golfer wishes to know how many of his tee shots were short. To learn this, he would press the buttons "tee" and "short", followed by the "enter" key. This will permit the clock to cause the counter to cycle through each address of the memory, in sequence, and deliver each word stored in the memory on conductors 37 to the memory output logic and thus to comparator 35. The word entered in the keyboard is also provided to comparator 35 so that the comparator can make a correlation between each word stored in the memory and the word entered into the keyboard. When the comparator determines that a word in the memory matches the data required by the word entered into the keyboard, an output signal is produced and delivered to the arithmetic logic unit. The arithmetic logic unit adds the total number of tee shots which were short, divides this by the total number of tee shots made, and produces a display indicating the percentage of short tee shots made by the golfer in that round of golf.

The golfer then has the choice of either erasing that information stored in the unit by placing it in the caddy and moving the erase switch to the "on" position; or simply replacing the unit in the caddy, leaving the information stored in the memory. In the latter case, the unit will be ready to store the information entered during a subsequent round or rounds of golf and the analysis can be made on the basis of a larger number of events. It will be observed that any of several analyses can be made using any type of shot and various combinations of descriptive qualifiers. In each case, information is displayed, depending upon the exact configuration of the arithmetic logic unit, which will permit the golfer to determine his strong and weak areas in the game and to concentrate on improving those areas which are weakest.

DETAILED DESCRIPTION OF FIGS. 3-6

FIGS. 3-6 show in somewhat greater detail a preferred arrangement of logic elements usable in the blocks of FIG. 2. It should be noted, however, that FIGS. 3-6 are somewhat simplified in that buffering diodes, which may be needed to prevent "sneak" circuits and similar minor refinements, which would be apparent to one skilled in the art, are omitted for simplification.

Figure 3:
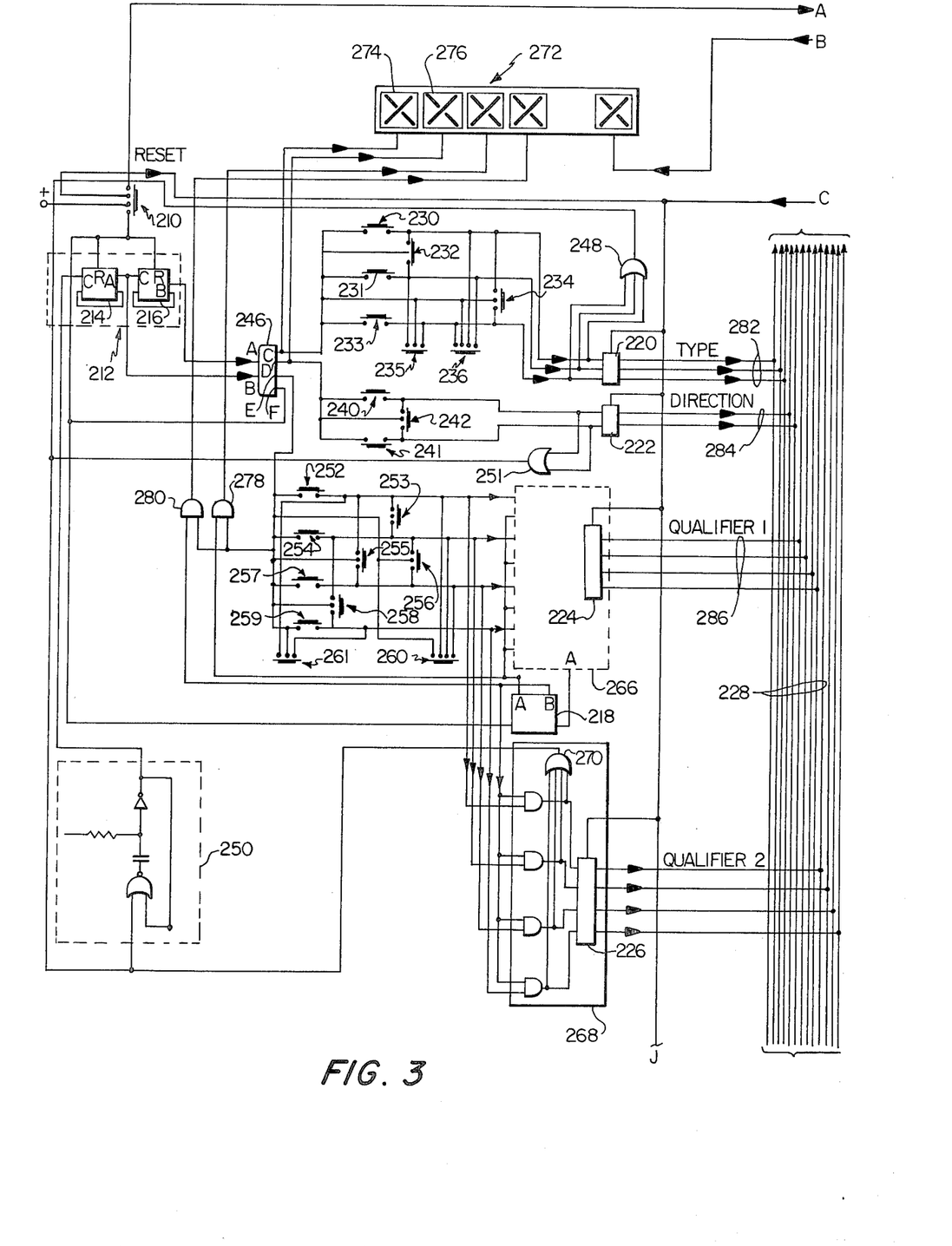
FIG. 3 is a more detailed schematic diagram, partly in block form, illustrating data entry and word-forming logic means usable in the apparatus of FIGS. 1 and 2.

As shown in FIG. 3, a normally open reset switch 210 is connected to a positive source of voltage which is the rechargable battery. Initialization is accomplished by closing switch 210 which applies the positive voltage to reset the address counter (FIG. 4), the comparator counters (FIG. 6) and the output counter (FIG. 4) which will be described in detail hereinafter. The positive reset voltage from switch 210 also initializes a two-stage flip-flop counter 212, a qualifier flip-flop 218 and four latches 220, 222, 224 and 226. In the following discussion, it will be assumed that the various circuits have been reset to this "initialized" state, and that the operator is ready to proceed with insertion of data. It will be observed that in the data insertion sequence, one of the functions of the circuits of FIG. 3 is to instruct the operator on the sequence of steps required to form a word suitable for insertion into the memory by sequentially illuminating indicators 272. A standard word consists of 13 bits and appears as a sequence of logic levels, either zero or one, on a multi-conductor cable 228. Signals from the formatting circuits of FIG. 3 flow through the conductor 228 to the EAROM memory 414 (FIG. 4) and to the comparator circuits of FIG. 5. It will be observed that a portion of the multi-conductor cable 228 is reproduced for convenience in each of FIGS. 3, 4 and 5.

There are four sections required for the construction of each word. These are entitled TYPE OF SHOT, DIRECTION, QUALIFIER 1 and QUALIFIER 2. The word segments produced by each of these sections contributes to the formation of the total word. The sections contribute 3, 2, 4 and 4 bits, respectively, so that the total word is 13 bits in length. It should also be noted that it is not essential for formation of a complete word that these sections have 1 levels on any output. Thus, a complete word could, theoretically, consist of all zeros, although the word would have no particular meaning.

The two-stage, four state, flip-flop counter 212 in conjunction with BCD to decimal decoder 246, flip-flop 218 and various gates, function to form the word with the four sections in their correct sequence, i.e., the type of shot is the first code entered in the sequence, the direction is second, and the first and second qualifiers, respectively, occupy the third and fourth positions of the sequence. As stated previously, counter 212 is initially set to the logic level 0 by closure of switch 210 which produces a logic level 1 at both input terminals A and B of decoder 246. With logic level 1 at both inputs, decoder 246 produces a logic level 1 at the output terminal C and logic level 0 at all other outputs. The relationship of the states of counter 212 and the logic levels of flip-flops 214 and 216 and encoder 246 are shown in Table 1.

TABLE 1

| State of Counter 212 | Logic Levels of Two-Stage Counter 212 and Decoder 246 | | | | | |
|---|---|---|---|---|---|---|
| | FF 214 Output A | FF 216 Output B | Decoder 246 Output Terminals | | | |
| | | | C | D | E | F |
| 1st | 1 | 1 | 1 | 0 | 0 | 0 |
| 2nd | 0 | 1 | 0 | 1 | 0 | 0 |
| 3rd | 1 | 0 | 0 | 0 | 1 | 0 |
| 4th | 0 | 0 | 0 | 0 | 0 | 1 |

The logic level 1 at terminal C of encoder 246 provides a voltage to each of the input terminals of switches 230–236 so that the first section of the word can be formed. Switches 230–236 correspond to the type-of-shot section of the keyboard described with reference to FIG. 1. Table 2 illustrates the correlation between the indicia provided on each of the keys, the reference numerals appearing in FIG. 3, and the digital codes which result as the first word segment in response to operation of each key.

TABLE 2

| | Logic Levels of Latch 220 | | | |
|---|---|---|---|---|
| Switch closed | Key Title | Terminals | | |
| | | A | B | C |
| 230 | Tee | 1 | 0 | 0 |
| 231 | Fairway | 0 | 1 | 0 |
| 232 | Approach | 1 | 1 | 0 |
| 233 | Pitch | 0 | 0 | 1 |
| 234 | Sand | 0 | 1 | 1 |
| 235 | Putt | 1 | 1 | 1 |
| 236 | Chip | 1 | 0 | 1 |

The switches are interconnected so that operation of any of switches 230–236 produces a unique combination of 1's and 0's to latch 220 and to OR gate 248. For example, closing switch 232 provides voltage to inputs A and B of latch 220 but no voltage to input C. The code associated with switch 232 (the approach shot key) is therefore 110, and, when the approach shot key is depressed, that code becomes the first segment of the word. If the operator wishes to enter a description of a tee shot, switch 230 is closed, causing a logic level 1 to appear at the upper input of latch circuit 220 which stores this level. Zero levels remain at the other two inputs. Thus, the word segment formed is 100.

At the same time, the actuation of any one of switches 230-236 provides a signal to OR gate 248 which passes a signal to a one-shot multivibrator 250 which provides a signal to counter 212, advancing it by one state. As shown by Table 1, the advancement of counter 212 from its first state to its second state results in a logic level 1 at terminal B of encoder 246 and, thus, at terminal D of encoder 246, supplying a voltage to the input terminals of each of switches 240-242 in preparation for forming the second section of the word. At this time, no voltage is provided to switches 230-236. Actuation of any one of switches 240-242 provides a signal to latch 222, which stores this signal as the second section of the word, and also a signal is provided through OR gate 251 to one-shot circuit 250 to advance counter 212 to its third state. Table 3 shows the correlation between key legends, switch identification and codes for the switches associated with latch 222, which become the second word segment.

TABLE 3

Logic Levels of Latch 222

| Switch Closed | Title | Latch Terminals A | B |
|---|---|---|---|
| 240 | LEFT | 1 | 0 |
| 241 | RIGHT | 0 | 1 |
| 242 | STRAIGHT | 1 | 1 |

The formation of the third and fourth sections of the word is similar, but not identical, to the first and second sections. In the third state of counter 212 as shown by Table 1, encoder 246 produces a logic 1 at terminal E, energizing the ten qualifying switches 252-261. These ten qualifying switches are used to form both the third and fourth sections of the word. At this time, it should be noted that the circuits within boxes 266 and 268 are identical to each other, those in 266 having been omitted for simplicity.

Flip-flop 218 determines whether the third section of the word is being formed by qualifying switches 252-261 and the gate and latch circuits in box 266, or whether the fourth section of the word is being formed by qualifying switches 252-261 and the gate and latch circuits in box 268. When reset button 210 is initially operated, flip-flop 218 is set to a logic level 1 at terminal A, thereby enabling the gates of box 266. Thus, when counter 212 advances to its third state producing a logic level 1 at terminal E of encoder 246 and energizing qualifier switches 252-261, a signal from one of those switches can be passed through one of the enabled gate circuits of box 266 to be held by the latch circuits contained within the box as a logic level 1 on one of the output terminals.

When any one of the qualifier switches 252-261 is closed, the gate circuit in box 266 which is identical to gate 270 of box 268 produces a logic level 1 at terminal A of box 266 and flip-flop 218 changes state, thereby producing a logic 1 at terminal B of 218 and enabling the four AND gates of circuits 268. With the gates of circuit 266 enabled and any one of switches 252-261 actuated, OR gate 270 produces a logic 1 to energize one-shot 250, the output of which sets counter 212 to its fourth state. The fourth state of counter 212 produces a logic 1 at terminal F of encoder 246 which resets counter 212 and flip-flop 218 to their initial conditions, thus completing the cycle.

The following table shows the correlation between the key labels, switches and codes for formation of the third and fourth word segments:

TABLE 4

Logic Levels for Latches 224 and 226

| Switch Title | No. | Terminals | | | |
|---|---|---|---|---|---|
| LONG | 252 | 1 | 0 | 0 | 0 |
| PULL | 253 | 1 | 1 | 0 | 0 |
| HOOK | 254 | 0 | 1 | 0 | 0 |
| SLICE | 255 | 1 | 0 | 1 | 0 |
| PUSH | 256 | 0 | 1 | 1 | 0 |
| SHORT | 257 | 0 | 0 | 1 | 0 |
| BLEW IT | 258 | 0 | 1 | 0 | 1 |
| TOP | 259 | 0 | 0 | 0 | 1 |
| SKY | 260 | 1 | 1 | 1 | 0 |
| AIM | 261 | 1 | 0 | 0 | 1 |

During the formation of the word in the sequence just described, the operator is repeatedly instructed by liquid crystal display 272, the operation of which will now be described. When the circuits were initialized by operating reset switch 210, resetting counter 212 to its initialized state, a logic 1 was produced at the C output of encoder 246. This voltage, in addition to being supplied to switches 230-236, is also supplied to the first section 274 of display 272, thereby illuminating the first indicator therein. The face of unit 10 can be provided with indicia underneath the segments of the illuminatable indicator to indicate that the type of shot is the first item to be selected. The operator then depresses one of the "type" push button keys labeled "tee", "approach", or the like, closing one of switches 230-236. As shown in Table 1, since decoder 246 provides an output which energizes only those switches, depression of any of the other switches has no effect.

As previously discussed, the closure of any one of switches 230-236 advances counter 212 by one state and advances the decoder as shown in Table 1, producing a logic level 1 at output D of encoder 246, extinguishing cell 274 and illuminating the second cell 276 of display 272. Cell 276 can be labeled "direction" and indicates to the operator that he should select and depress one of switches 240-242 to form the second section of the word. In a similar fashion, the third and fourth cells of display 272 are illuminated in sequence, instructing the operator to form the third and fourth portions of the word. As previously described, the formation of the third and fourth sections is controlled by flip-flop 218, the output of which control the third and fourth cells of display 272 through the sequential enabling of AND gates 278 and 280. A function of the remaining cells of the display will be discussed in conjunction with subsequent logic in the system.

At this stage, an entire digital word has been formed and is being held by latch circuits 220, 222, 224 and 226 such that a sequence of logic 1 and 0 levels appears on the 13 conductors in conductor groups 282, 284, 286 and 288, and on multi-conductor cable 228.

Figure 4:
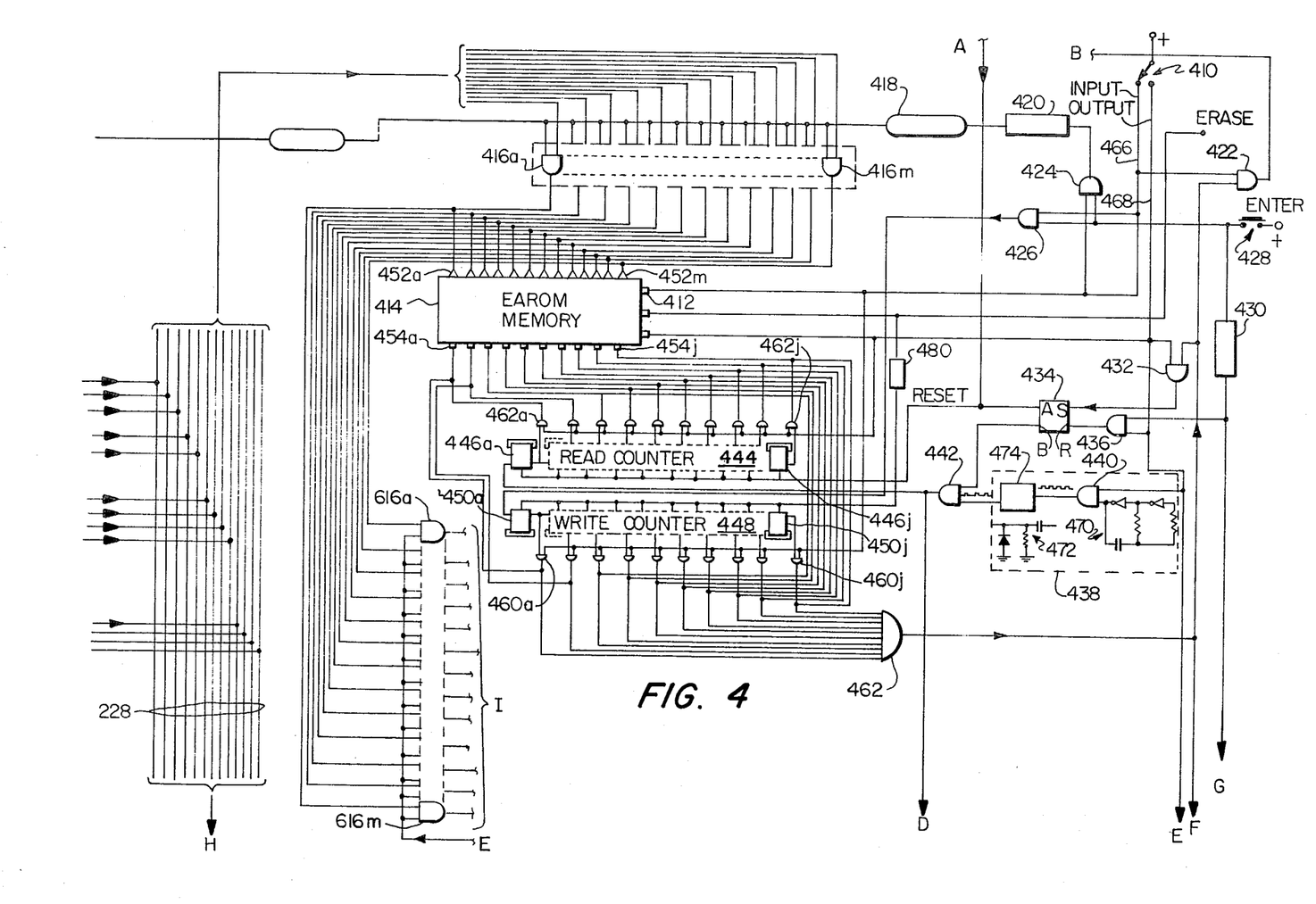
FIG. 4 is schematic diagram, partly in block form, illustrating memory, clock and logic portions usable in the apparatus of FIGS. 1 and 2.

Turning now to FIG. 4, it will be seen that each of the conductors of cable 228 is connected to an input of AND gates 416*a-m* in the memory input logic. The other input of these AND gates are all connected through a delay circuit 418, a one-shot multivibrator 420, and an AND gate 424 to the ENTER switch 428 and to the input conductor of mode selection switch 410. Because data is being entered into the unit, the mode switch is in the input state, thereby connecting a positive voltage to the input conductor of the mode switch and, thus, to one input terminal of each of AND gates 422, 424 and 426. Depressing the ENTER switch 428 connects a positive voltage to the other input of AND gate 424, thereby activating multivibrator 420 and sending an enabling signal through delay 418 to AND gates 416a–m. This permits the words supplied on cable 228 to enter an appropriate storage location in memory 414 on conductors 452a–m. The function of the delay circuit 418 is to assure that an address signal is supplied to terminals 454a–m of memory 414 prior to the insertion of the word message. A description of the formation of the memory address and the logic which controls this formation will now be described.

Write counter 448 is a conventional ripple counter constructed using ten flip-flops 450a–j. The closure of ENTER switch 428 actuates the second leg of AND gate 426, the other leg having been supplied with a voltage from the mode switch. This provides a logic 1 at the output of gate 426 which is applied to flip-flop 450a, thus advancing the count in counter 448 by one count. In a similar way, a second closure of ENTER switch 428 advances the counter 448 by another count.

The output of counter 448, as indicated by the states of the individual flip-flops 450a–j, respectively, is applied to the first leg of AND gates 460a–j and, since the second leg of each is energized at all times while the mode selector switch is in the input mode, the output of the counter appears as an output of AND gates 460a–j, while in the input mode.

The output of the write counter 448 as it appears at AND gates 460a–j is also applied as an address signal to terminals 454a–j of memory 414 and also to the inputs of the ten-legged AND gate 462. Read and write counters 444 and 448 each have ten binary stages and therefore hold a total count of decimal 1024, including the initializing or reset count of all logic levels at zero. Thus, the final count is equal to a decimal number 1023 which consists of all logic level 1's at all flip-flop stages. The logic level 1's from counter 448 are applied to the first leg of AND gates 460a–j and, with the second leg of all ten gates having a logic level 1 at all times when the device is in the input mode, a logic level 1 appears at the output of all AND gates 460a–j and at the input of all ten input legs of AND gate 462. When the write counter reaches a total count of 1023, therefore, the output of gate 462 switches to a logic level 1. In the input mode, this signal is applied to one leg of AND gate 422, the other leg having a positive voltage from mode switch 410, so that a logic level 1 appears at the output of that gate. This is applied to the fifth cell of display 272, indicating to the operator that the memory capacity of the device is exhausted. The "counter full" AND gate 462 also receives an input from the read counter 444 through AND gates 462a–j in the output mode and, therefore, serves the dual function of indicating when the read counter 444 is full. This will be described in further detail when discussing the output mode.

To briefly summarize the operation of the golf analyzer when it is operating in the input or write mode, the operator forms a message word, using the keyboard, in the latch circuits 220, 222, 224 and 226, following the sequence instructions appearing on the liquid crystal display 272. This message word is inserted in the memory 414 in a unique address slot at the time the ENTER button 428 is depressed. The address of each word is the number of that word and is formed and held in write counter 448. The address number advances the counter by one count in sequence for each word which is entered, starting with the number zero for word one. After the completion of the formation and entry of each word, the reset button is depressed, initializing (resetting) the logic circuits in preparation for formation and entry of the next word.

OUTPUT MODE

At any time after the entry of one or more words, completely at the discretion of the user, he can recall the data entered. Operationally, the procedure for recalling data is much like the procedure for entering data. Briefly, the operator forms a word by depressing the appropriate ENTER buttons following the sequence as instructed by the liquid crystal "next entry" display 272. The word formed is a description of the data which the operator wishes to recover and display.

Figure 5:
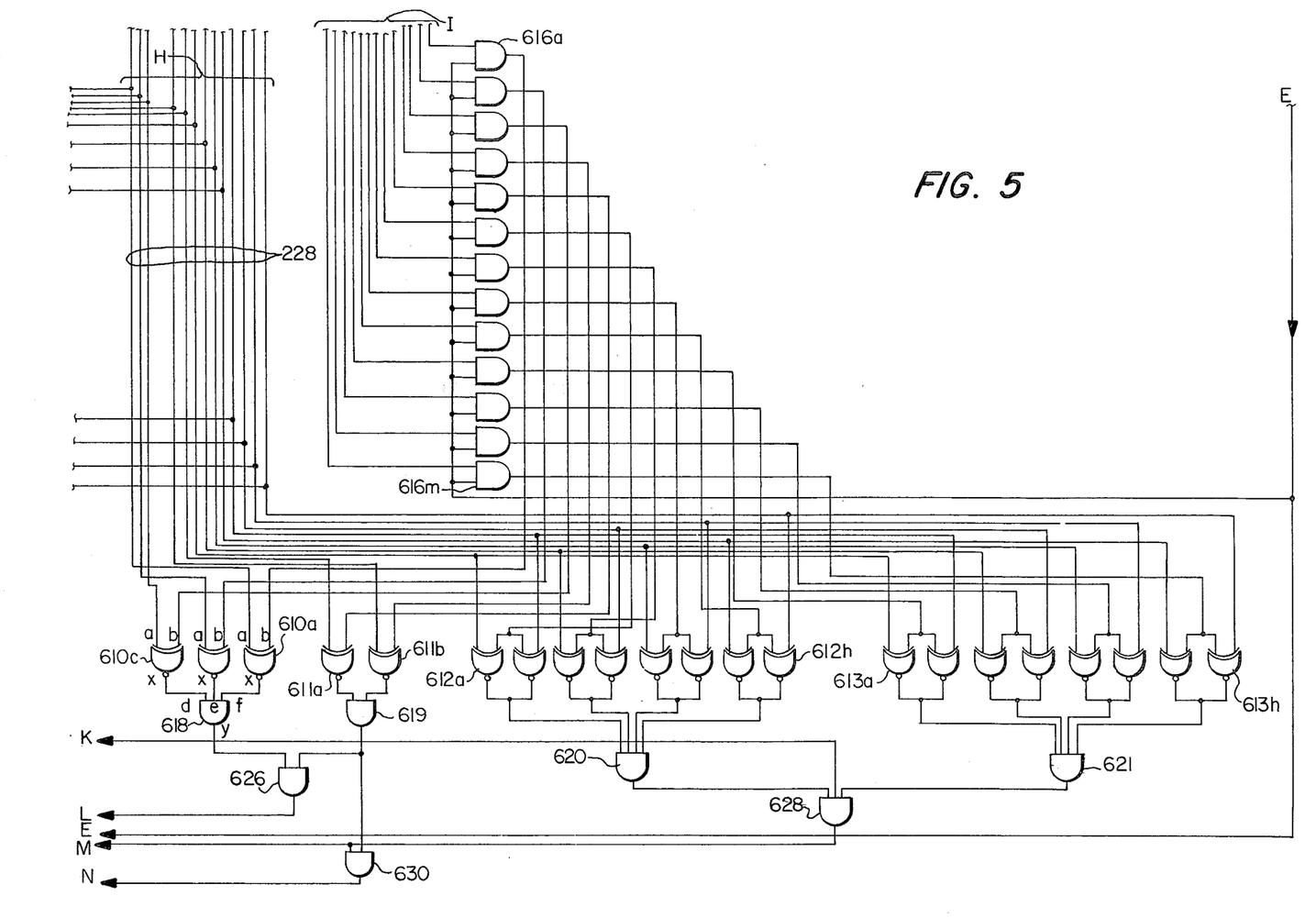
FIG. 5 is a schematic diagram, partly in block form, illustrating logic and comparator portions usable in the apparatus of FIGS. 1 and 2.
Figure 6:
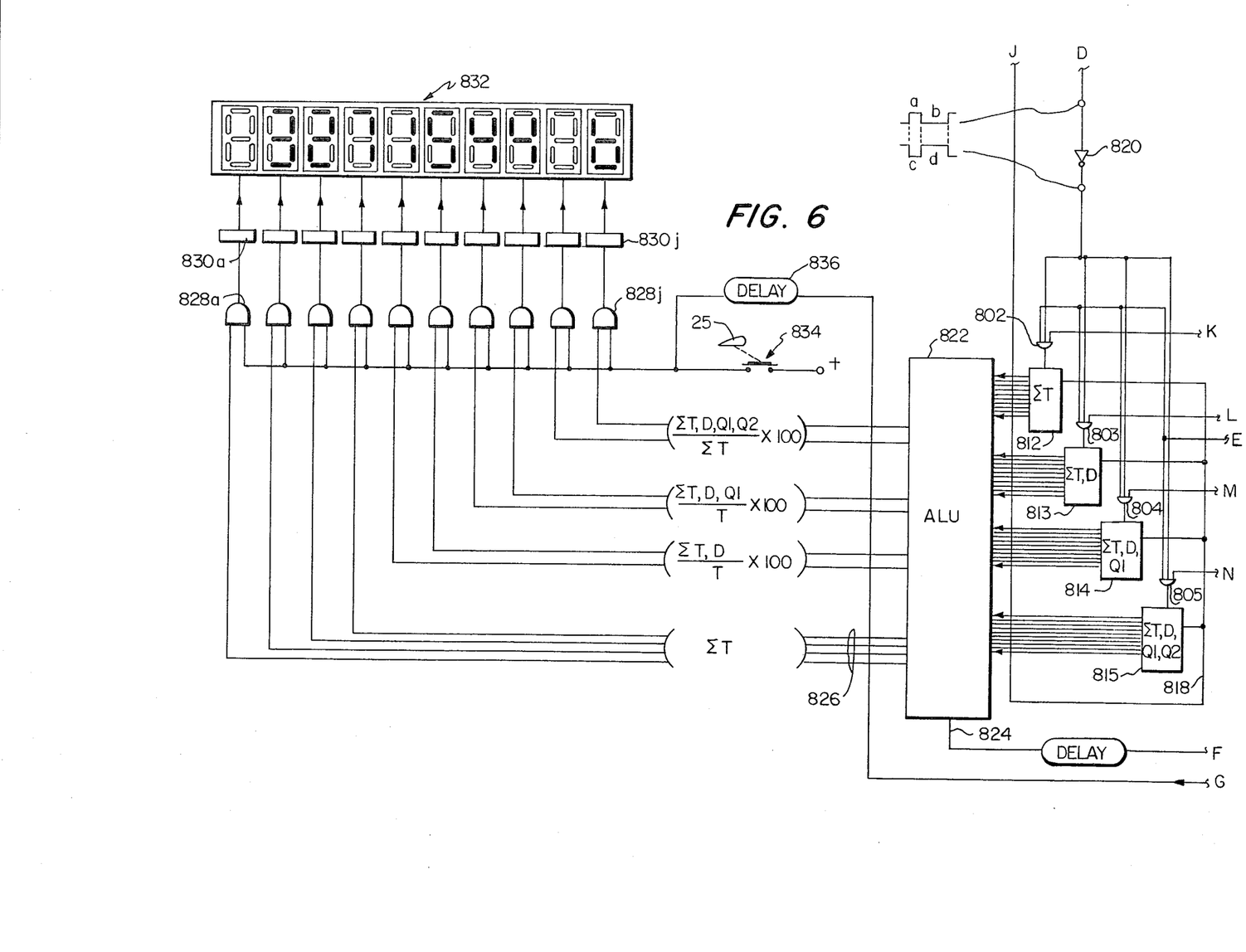
FIG. 6 is a schematic diagram, partly in block form, illustrating counting, arithmetic and display portions usable in the apparatus of FIGS. 1 and 2.

In the output mode, the word formed on latches 220, 222, 224 and 226 is conducted via multi-conductor cable 228 to a comparator circuit means including a plurality of inverting exclusive-OR gates 610–613 (FIG. 5) wherein it is held by the latches until the entire memory is searched. The exclusive OR gates 610–613 perform a comparison of the word held in the latches with the data stored in memory 414. If at least a partial comparison exists, a signal is passed to counters 812–815 as seen in FIG. 6. The degree of comparison necessary to produce a signal is described in conjunction with the detailed description of the exclusive-OR gates 610–613.

The logic circuits of the golf analyzer as they are used in the output, or read, mode are described starting with the mode selector switch 410 in the output position, all of the circuits initialized by depression of the reset button 210 as previously described, and an output word formed by depression of the appropriate keys and stored on latches 220, 222, 224 and 226 awaiting entry into the logic circuits. It will be observed that when the mode selector switch is moved from the input position to the output position, the positive voltage previously supplied to input line 466 is removed, thus disabling gates 422–426, the write capability of the memory 414, and the write counter output gates 460a–j.

Application of a positive voltage to line 468 by the movement of switch 410 to the output mode enables the read capability of memory 414, read counter gates 462a–j, flip-flop 434, control gates 432 and 436, and clock gate 440. In the output mode, the memory is always searched from the first to the last memory slot by sequencing the read counter 444 through its total count starting with the first step of all zeros and continuing through the stages until the count of 1023 has been reached at which time it is ready to start with the zero count again.

Whereas the write counter 448 was stepped through the count by individual pulses generated by repeated closure of ENTER switch 428, the read counter 444 is stepped through its count sequence by pulses emanating from clock circuit 438. The clock circuit, which is not running in the input mode, is turned on by the application of the positive voltage from the mode select switch to AND gate 440. This circuit, indicated generally at 470 and 472, includes networks of conventional clock oscillator, and is illustrated without further description. A one-shot multivibrator 476 in conjunction with a circuit such as that shown at 472 properly shapes the clock pulses. The clock pulse is shaped so that its duration provides sufficient time for the word to be registered in the comparator and for the arithmetic logic unit counters to operate properly. While in the output mode and during the data entry phase of operation of the analyzer, but with the ENTER button 428 not depressed, gate 432 is disabled and flip-flop 434 remains in its natural state which is a logic 1 at terminal A and a logic 0 at terminal B. The logic level 1 at terminal A assures that all stages of read counter 444 are in the zero state. After the word has been formed on the latches indicating the kind of data desired, the ENTER button 428 is depressed, enabling AND gate 436 by a pulse formed by one-shot multivibrator 430. When AND gate 436 is enabled, a logic level 1 is provided at its output which resets flip-flop 434 producing a logic level 1 at output terminal B. The logic 1 at output B enables gate 442, permitting a series of shaped clock pulses to be applied to the input counter stage 446a of read counter 444. It is significant to note that once read counter 444 has started to count, it cannot be stopped by any manual operation, but only upon the counter reaching a count of 1023 which produces a logic level 1 at each counter stage. These ten logic level 1's are applied to the input of gate 462 which produces a logic level 1 at its output which, in turn, is applied to gate 432 producing a logic 1 at its output which sets flip-flop 434. The setting of flip-flop 434 produces a logic level 1 at terminal 8 which resets and holds all read counter stages 446a-j in their zero condition.

As described in connection with write counter 448, the count number contained in counters 444 and 448 is the address of the data being written in or extracted from memory 414, respectively. Thus, as the read counter 444 sequences from a count of all zeros to a count of all ones, the entire memory 414 is examined by AND gates 616a-m and, since the first leg of each of the gates is always enabled while in the output mode, the word being examined on the memory appears as an input to the exclusive-OR gates 610-613.

The comparator circuits sequentially compare the data entry word held in the data entry latches with each of the words previously stored in the memory. When a correlation is found, an entry is made in the appropriate counter, for example, counter 812. In order to properly extract and identify the data from the memory, however, both the complete input code and its location within the 13-bit word structure must be recognized.

The code for the type of shot which forms the first three logic levels (the first segment) of the 13-bit word is described in Table 2. This table shows that a tee shot is identified by a logic level 1 on line 1 and logic level 0's on lines 2 and 3. As described previously, a tee shot is stored in the memory in this exact format. In extracting any shot data from the memory, the comparator circuits consisting of exclusive-OR gates 610a-c, 611a-b, 612a-h and 613a-h together with AND gates 618-621, 626, 628 and 630 compare the word held on the latches with the word in memory.

The logic rules for the operation of exclusive inverting OR gates 610a, b and c are shown in Table 5. This table shows, for example, that with a logic level zero at both input terminals A and B, the inverted output at output terminal X is a logic level 1. The output logic levels at terminal X can be found for other logic levels on input terminals A and B by examination of the table.

TABLE 5

| Logic Levels of Exclusive Inverting OR Gates 610a, b and c | | |
|---|---|---|
| Input Terminal | | Output Terminal |
| A | B | X |
| 0 | 0 | 1 |
| 1 | 1 | 1 |
| 0 | 1 | 0 |
| 1 | 0 | 0 |

In Table 6 is shown the logic levels at output terminal Y of AND gate 618 for various logic level inputs at terminals D, E and F.

TABLE 6

| AND Gate 618 | | | |
|---|---|---|---|
| Input Terminals | | | Output Terminal |
| d | e | f | Y |
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

Tables 5 and 6 are given by way of example, and similar tables can be produced for the balance of the exclusive OR gates 611-613 and AND gates 619-621 by one skilled in the art or by reference to textbooks dealing with logic circuits.

In further explanation of the logic levels, using a tee shot as an example of a type of shot and applying Tables 2, 5 and 6, it can readily be seen that the following logic levels will exist at the element identified. Thus, at latch 220, terminal A will be a logic 1, while terminals B and C will both be 0's. On OR gate 610a, terminal A and terminal B will be logic 1's, thus producing a logic 1 at terminal X, while OR gates 610b and 610c will each have logic level 0's at both terminals A and B, producing a logic 1 at each of their output terminals X. It can also be seen that AND gate 618 will have at input terminals D, E and F, logic 1's, thus producing a logic 1 at the output terminal Y for insertion into counter 812.

As a further example of the data extraction process and the initial arithmetic process, it can be seen by reference to FIG. 5 that the organization of the exclusive OR gates and the associated AND gates is such that the output of AND gate 618 corresponds to the first part of the word which we have identified as "∓type of shot". In a similar way, the output of AND gate 619 corresponds to the second portion of the word which has been identified as "direction of shot". In a similar way, the output of AND gates 620 and 621 correspond to the third and fourth sections of the word which have been identified as qualifier 1 and qualifier 2.

A further word of explanation is required regarding the operation of the comparator circuits. Referring back to FIG. 3, it will be recalled that both the third and fourth section of the word, qualifiers 1 and 2, are formed by the same set of entry switches 252-261. Because of this arrangement, it is possible for the operator to form a work representative of either a "long hook shot" or a "hook long shot". Stated differently, the sequence of the qualifier is not preestablished for the operator. Furthermore, the logic circuits have been arranged so that the operator may insert "long" as a first qualifier and "hook" as a second qualifier when inserting data and to then reverse the order (inserting "hook" first and "long" second) when extracting data. This is accomplished by providing a duplicate set of exclusive OR gates for qualifiers 1 and 2. These gates are identified as 612e–h and 613a–h.

After the data has been read from the memory, the sum of the pulses produced at the output of each of the AND gates 618–621 is equal to the number of entries made for each of the four sections of the word respectively. That is, the numerical count of the logic level 1 produced at the output of AND gate 618 represents the number of entries made under a specific type of shot entered during the "enter" mode, and extracted during the output mode. In the same way, the numerical count of the logic level 1's produced at the output of AND gate 619 represents the number of entries made under a specific direction of shot entered during the enter mode and extracted during the output mode. The numerical count of the logic level 1's produced at the output of AND gate 620 represents the number of entries made under a specific qualifier 1 during the enter mode and extracted during the output mode and, finally, the numerical count of the logic level 1's produced at the output of AND gate 621 represents the number of entries made under a specific qualifier 2 entered during the enter mode and extracted during the output mode. However, only in the case of gate 618, which produces output pulses for the type of shot entered, does the sum appear directly in a counter to be processed by the arithmetic logic unit and displayed. In each of the other three entries, i.e., direction and the qualifiers 1 and 2, the sum of all the logic level 1's produced at the output of AND gates 619–621 is modified by the action of at least one gate which follows. For example, in the case of the second section of the word, i.e., direction of shot, the output of AND gate 619 is combined with the output of AND gate 618 by means of AND gate 626 which then produces a logic level 1 output pulse only when both gates 618 and 619 are enabled and, therefore, both inputs to gate 626 are logic level 1's. Gates 628 and 630 combine qualifiers 1 and 2 in a similar fashion.

Ripple counters 812–815 are ten-stage, flip-flop counters identical to the input and output counters 444 and 448, already described. Counters 812–815 are initialized, or set to zero, by application of a positive voltage from reset switch 210 on line 818. Logic level 1's from comparator AND gates 618, 626, 628 and 630 are fed to counter AND gates 802–805, respectively, for insertion into counters 812–815, respectively.

AND gates 802–805 are enabled when three conditions are met. These conditions are:

a. Receipt of logic level 1's from AND gates 618–621;
 b. Receipt of a positive voltage from mode switch 410 when in the output mode; and
 c. Receipt of a clock pulse from clock circuit 438 via inverter amplifier 820.

Referring to the waveforms in FIG. 6 indicated generally at 838, the clock circuit produces a repetitive sequence of signals each cycle of which has a waveshape including a positive-going portion a followed by a negative-going portion b. In the output mode, portion a functions as a logic level 1 signal to advance read counter 441 by one count. Amplifier 820 inverts the entire waveshape to produce a positive-going portion c at its output, portion c being delayed relative to portion a. Thus, the logic 1 at the output which enables AND gates 801–805 occurs after the logic 1 which is provided at the amplifier 820 input. This assures that a count will be inserted into one or more of the ripple counters 812–815 only after readout of the memory circuits and matching of the various logic levels by the comparator circuits has taken place.

Counters 812–815 each include ten flip-flop stages so that the counters have a capacity of 1024 counts. The output of the counters, which is in binary coded decimal form, is transferred to the arithmetic logic unit by means of one line for each counter stage, or ten lines for each counter.

When clock 438 has caused read counter 444 to sequence through all 1024 slots of memory 414, a signal from AND gate 462 indicates that counter 448 is full, thus enabling arithmetic logic unit 822 at terminal 824. This enable signal causes the count in counters 812–815 to be transferred to the arithmetic unit.

The ALU processes the counts received from the comparator circuits via the ripple counters 812–815 to produce the binary equivalent of the sum of types of shots on output lines 826. The output signal on line 826, which is in binary coded decimal form, is transmitted to the coders 830a–j through manually controlled AND gates 828a–j. The decoders function to convert the signals from binary coded decimal to seven segment display signals. AND gates 828a–j are enabled by operating one of the manual display switches, shown generally at 834, which effectively illuminates display 832.

On the drawing, the four lines indicated at 826 actually represent four lines each, for a total of 16 lines. Each of the four lines shown carry the BCD signals necessary for displaying one decimal number on one cell of display 832.

Upon the closure of manual display switch 834, a signal is also sent through delay 836 and gate 436 to reset flip-flop 434. Resetting of flip-flop 434 sets read counter 444 to zero and permits the extraction of a second set of signals from the memory according to the desires of the operator, as long as the analyzer remains in the output mode.

As will be recognized from the foregoing, the comparators and the ALU are capable of performing several analyses. As shown in FIG. 6, the ALU can be connected to (a) sum all of the shots of the requested type; (b) to separately sum all of the shots of the specified type which, additionally, went in the specified direction; (c) to separately count and sum all of the shots of the specified type which went in the specified direction and which, additionally, were described by one qualifier; and (d) to separately add those which, additionally, were described by the second specified qualifer. The ALU can then present to the decoders and the display the sum (a), and separately divide each of (b), (c), and (d) by (a) (multiplied by 100) and display each of these as a percentage.

Thus, as an example, assume the following conditions as representing some of the data stored in the memory:
 approach shots: 46
 approach shots: which went to the left: 30
 approach shots: which were left and short: 6
 approach shots: which were left, short and hooked: 5

Assume, then that the unit is placed in the output mode and the operator sequentially presses "approach", "left", "short", "hook", and "enter". The display, from left to right would display the numerals (rounded, for this discussion):

| 46 | 65 | 13 | 11 |
| --- | --- | --- | --- | which would, by reference to the labels below the display window, inform the operator that he had (presumably in two 18-hole rounds) made 46 approach shots of which 65% were left, 13% were left and short, and 11% were left, short and hooked. Since all data remains in the memory, similar analyses of other shots can be made.

A variety of conventional ALU devices for performing these relatively simple calculations are commercially available and the internal interconnections are therefore not shown in detail. One such device which can be used for this purpose is a Texas Instruments model SN74181 which uses TTL integrated circuits. It would, of course, be possible to use a relatively simple microprocessor which could also include counters 812–815.

While one advantageous embodiment has been chosen to illustrate the invention, it will be understood by those skilled in the art that various changes and modifications can be made therein without departing from the scope of the invention as defined in the appended claims.

What is clamed is:

1. An apparatus for storing and retaining data describing a plurality of events and for selectively displaying cumulative descriptive information about those events comprising the combination of
   a keyboard having a plurality of keys;
   first logic means coupled to said keyboard for forming a digital word having a predetermined bit length in response to operation of at least one key;
   an addressable memory;
   a clock for producing a sequence of timing pulses;
   a mode switch having an input position and an output position;
   input logic means coupled to said memory for permitting successive parallel storage of each word formed by said first logic means when said mode switch is in said input position;
   output logic means connected to said clock, said memory and said mode switch for responding to pulses from said clock only when said mode switch is in the output position to sequentially read out each word from said memory;
   comparator means coupled to said first logic means and to said memory for comparing each word read out of said memory with a word formed in said first logic means and for producing an output signal when correspondence between the compared words exists; and
   means for accumulating a count of said output signals and for displaying symbols representative of said count.

2. An apparatus according to claim 1 wherein said keyboard is functionally separated into two groups, each group including a plurality of keys, said keyboard having indicia associated with the keys in one of said key groups describing an identifying characteristic of the event to which each of said keys in said one group relates;
   indicia associated with the keys in the other of said groups describing a quality describing characteristic of the event to which each of the keys in said other group relates;
   and wherein said keyboard includes an enter key connected to said input logic means for actuating said input logic means.

3. An apparatus for storing and retaining data describing a plurality of golf shots made by a player and for selectively displaying cumulative descriptive information about those shots comprising the combination of
   a keyboard having a plurality of keys functionally separated into at least two groups, each group including a plurality of keys;
   indicia associated with the keys in a first one of said key groups describing the type of shot to which each of said keys in said first group relates;
   indicia associated with the keys in a second one of said groups describing the quality of the shot to which each of the keys in said second group relates;
   first logic means coupled to said keyboard for forming a digital word having a predetermined bit length in response to operation of at least one key in at least said one group;
   an addressable memory;
   a mode switch having an input position and an output position;
   input logic means coupled to said memory for permitting successive parallel storage of each word formed by said first logic means when said mode switch is in said input position;
   output logic means connected to said clock, said memory and said mode switch for responding to pulses from said clock only when said mode switch is in the output position to sequentially read out each word from said memory;
   comparator means coupled to said first logic means and to said memory for comparing each word read out of said memory with a word formed in said first logic means when said mode switch is in the output position and for producing an output signal when correspondence between the compared words exists; and means for accumulating a count of said output signals and for displaying symbols representative of said count.

4. An apparatus according to claim 3 wherein said keyboard includes
   an "enter" key coupled to said input logic means for causing said logic means to transfer a word formed in said first logic means into said memory, and for placing said first logic means in a reset state.

5. An apparatus according to claim 4 wherein said first logic means inludes
   a first logic circuit connected to said first group of keys for forming a portion of said digital word in response to operation of a key in said first group;
   first circuit means for enabling said first logic circuit only in said reset state;
   a second logic circuit connected to said second group of keys for forming a second portion of said digital word in response to operation of a key in said second group;
   second circuit means for enabling said second logic means only after a word portion has been formed in said first logic circuit;
   said apparatus further including a plurality of illuminatable indicators connected to said first logic means such that a first one of said indicators is illuminated when said first logic means is in the reset state, a second one of said indicators is illuminated when said second logic circuit is enabled, and a third one of said indicators is illuminated when a word has been formed in said second logic circuit, thereby indicating to an operator the next function to be performed.

6. An apparatus according to claim 4 wherein the keys in said second one of said groups is divided into a first subgroup of keys having indicia indicating the quality of the shot other than direction.

7. An apparatus according to claim 6 wherein said first logic means includes a logic circuit having at least three output terminals and at least three states for producing an output voltage sequentially at one of said output terminals in each state;

switch means operatively associated with each key for producing an electrical signal when its associated key is actuated and when the group to which said key belongs is supplied with voltage; and circuit means interconnecting said switch means associated with each of said first group and said first and second subgroups to one of said output terminals, said logic circuit being connected to supply voltage to the output terminal connected to said first group when said first logic means is in said reset state, to supply voltage to the output terminal connected to said first subgroup in response to operation of a key in said first group, and to supply voltage to the output terminal connected to said second subgroup in response to operation of a key in said first subgroup.

8. An apparatus according to claim 7 wherein said first logic means further includes first, second and third latch means connected respectively to the switch means associated with said first group and said first and second subgroups for storing binary signals representative of the actuation of keys in said groups.

9. An apparatus according to claim 8 wherein said comparator means includes a plurality of exclusive-OR gates; and circuit means for interconnecting first, second and third groups of gates in said plurality of said gates to said first, second and third latch means, respectively.

* * * * *